US011890886B2

(12) United States Patent
Fukui

(10) Patent No.: US 11,890,886 B2
(45) Date of Patent: Feb. 6, 2024

(54) METHOD OF MANUFACTURING OUTER CASE FOR HOT WATER UNIT

(71) Applicant: NORITZ CORPORATION, Hyogo (JP)

(72) Inventor: Nobuhiro Fukui, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 389 days.

(21) Appl. No.: 17/271,195

(22) PCT Filed: Aug. 23, 2019

(86) PCT No.: PCT/JP2019/032986
§ 371 (c)(1),
(2) Date: Feb. 24, 2021

(87) PCT Pub. No.: WO2020/045267
PCT Pub. Date: Mar. 5, 2020

(65) Prior Publication Data

US 2021/0245537 A1 Aug. 12, 2021

(30) Foreign Application Priority Data

Aug. 29, 2018 (JP) ................................. 2018-160318

(51) Int. Cl.
*B05D 7/14* (2006.01)
*B41M 5/00* (2006.01)
(Continued)

(52) U.S. Cl.
CPC ........... *B41M 5/0047* (2013.01); *B21D 19/08* (2013.01); *B21D 51/16* (2013.01); *F24H 9/02* (2013.01)

(58) Field of Classification Search
CPC ......................... B41M 5/0047; B41M 5/0058; B41M 7/0045; B41M 7/0081; B21D 19/08;
(Continued)

(56) References Cited

U.S. PATENT DOCUMENTS

2007/0119447 A1* 5/2007 Ito ............................. F24H 9/02
126/116 R
2018/0186131 A1* 7/2018 Kudo ...................... B32B 27/08

FOREIGN PATENT DOCUMENTS

JP 10296906 A * 11/1998
JP H11294867 10/1999
(Continued)

OTHER PUBLICATIONS

English translation of Takayama (JP201440950) (Year: 2014).*
(Continued)

*Primary Examiner* — Jun S Yoo
(74) *Attorney, Agent, or Firm* — JCIPRNET

(57) ABSTRACT

This method of manufacturing an outer case for a hot water unit involves a pressing step for subjecting a flat metal plate (30a) to press processing to form a component part (3) of the outer case (C), and a painting step for painting text, symbols, figures or patterns on the component part (3), wherein the painting step involves an inkjet printing step for forming an inkjet printing layer (4) by performing inkjet printing on the flat metal plate (30a). The pressing step is performed after the inkjet printing step, and after the pressing step, there is further a clear coating step for forming a clear layer (5) on the inkjet printing layer (4).

6 Claims, 7 Drawing Sheets

(51) Int. Cl.
*B21D 19/08* (2006.01)
*B21D 51/16* (2006.01)
*F24H 9/02* (2006.01)

(58) Field of Classification Search
CPC ......... B21D 51/16; B21D 22/201; F24H 9/02; B05D 3/0263; B05D 7/576; B05D 2202/10; B05D 3/067; B05D 1/02; B05D 2701/10; B05D 7/14; B41J 2/01
See application file for complete search history.

(56) References Cited

FOREIGN PATENT DOCUMENTS

| | | | | | |
|---|---|---|---|---|---|
| JP | 2007155138 | | | 6/2007 | |
| JP | 2007155138 | A | * | 6/2007 | ............... F24H 9/02 |
| JP | 2007197931 | | | 8/2007 | |
| JP | 2007197931 | A | * | 8/2007 | |
| JP | 2012032029 | | | 2/2012 | |
| JP | 2014040950 | | | 3/2014 | |
| JP | 2014040950 | A | * | 3/2014 | |
| WO | 2011040218 | | | 4/2011 | |

OTHER PUBLICATIONS

English translation of Ito (JP2007155138) (Year: 2007).*
English translation of Shimizu (JP2007197931) (Year: 2007).*
"International Search Report (Form PCT/ISA/210) of PCT/JP2019/032986," dated Oct. 8, 2019, with English translation thereof, pp. 1-4.

* cited by examiner

METHOD OF MANUFACTURING OUTER CASE FOR HOT WATER UNIT

CROSS-REFERENCE TO RELATED APPLICATION

This application is a 371 application of the international PCT application serial no. PCT/JP2019/032986, filed on Aug. 23, 2019, which claims the priority benefit of Japan application no. 2018-160318, filed on Aug. 29, 2018. The entirety of each of the above-mentioned patent applications is hereby incorporated by reference herein and made a part of this specification.

TECHNICAL FIELD

The present invention relates to a manufacturing method for manufacturing an outer case for a hot water unit. The hot water unit is, for example, a hot water supply device or a cogeneration system, in which a hot water device for generating hot water or storing hot water is accommodated in an outer case.

BACKGROUND ART

As a specific example of a hot water unit configured as a hot water supply device, there is an example in which a hot water device, which heats water using combustion gas generated by a burner, is accommodated in an outer case (for example, see Patent Literatures 1 to 3). The outer case for the hot water unit is generally manufactured by pressing a colored steel plate having a front surface of a single color.

In such a hot water unit, for example, in addition to displaying text or symbols representing a manufacturer name, a type, an ability or the like of the hot water unit on the outer case, in some cases, a wide range of the surface of the outer case needs to be covered with a color different from a ground color of the surface of the colored steel plate. In this case, in the related art, after forming component parts of the outer case (an outer case main body and a cover body) by press molding, the component parts are painted by a spray method.

However, in the above-mentioned related art, there is the following room for improvement.

When the spray-type painting means of the related art is used, masking of an unpainted portion and color matching of the paint are troublesome. In addition, work of spraying paint using a spray gun (an air gun) is also troublesome and requires skill. Therefore, workability and productivity are poor. Furthermore, since the paint is sprayed onto the masking portion, much paint is wasted. Therefore, the manufacturing cost of the outer case and the manufacturing cost of the hot water unit increase. As the pattern to be painted becomes more complicated and the number of colors increases, such defects become remarkable. According to some spray methods, it is also difficult to express detailed patterns.

Further, in the related art, since the outer case is press-molded and then painted, it is also difficult to properly apply a predetermined paint to an uneven portion of the outer case.

In the related art, a transfer type coating means has also been appropriately adopted. However, according to the coating means of this transfer method, a transfer plate is required, which leads to a high cost. Moreover, it is not suitable for painting a large area.

On the other hand, the paint applied to the outer case is easily damaged by influences of wind and rain or sunlight including ultraviolet rays, and contamination and fading are likely to occur.

CITATION LIST

Patent Literature

[Patent Literature 1]
Japanese Patent Laid-Open No. 2012-32029
[Patent Literature 2]
Japanese Patent Laid-Open No. H11-294867
[Patent Literature 3]
Japanese Patent Laid-Open No. 2014-40950

SUMMARY OF INVENTION

Technical Problem

The present invention provides a method of manufacturing an outer case for a hot water unit, which can appropriately solve the aforementioned problems.

Solution to Problem

In order to solve the above problems, the following technical measures are taken in the present invention.

A method of manufacturing an outer case for a hot water unit provided by the present invention has a pressing step of pressing a flat metal plate to form a component part of an outer case used to accommodate a hot water device for hot water generation or hot water storage inside; and a painting step of painting one of letters, symbols, figures or patterns on the component part of the outer case, in which the painting step includes an inkjet printing step of forming an inkjet printing layer by performing inkjet printing on the flat metal plate, the pressing step is performed after the inkjet printing step, and after the pressing step, a clear coating step of forming a clear layer on the inkjet printing layer is further included.

Preferably, a clear paint containing an ultraviolet absorber is used in the clear coating step.

Preferably, the clear coating step is a spray coating which uses a clear paint containing an ultraviolet curable resin or a thermosetting resin, as the paint.

Preferably, the outer case includes an outer case main body having an opening on at least one surface, and a cover body attached to the outer case main body to close the opening, and the inkjet printing step, the pressing step, and the clear coating step are performed, as a manufacturing means of the cover body.

Preferably, the pressing step includes a step of drawing the metal plate, and in the inkjet printing step, a thickness of the inkjet printing layer in a portion of a planned region of drawing in which a thickness of the metal plate is thinner than other portions is set to be thinner than the thickness of the inkjet printing layer of the other portions.

Preferably, the pressing step includes a step of providing the metal plate with a burring hole into which a burring portion protrudes from a peripheral edge of the opening, and in the inkjet printing step, a second inkjet printing layer connected to a first inkjet printing layer provided in the peripheral portion is provided as the inkjet printing layer in the planned region which is the burring portion.

Preferably, a mark for positioning the metal plate at the time of performing the pressing step is printed in the inkjet printing step.

Other features and advantages of the present invention will become more apparent from the following description of embodiments of the invention with reference to the accompanying drawings.

DESCRIPTION OF EMBODIMENTS

Figure 1A:
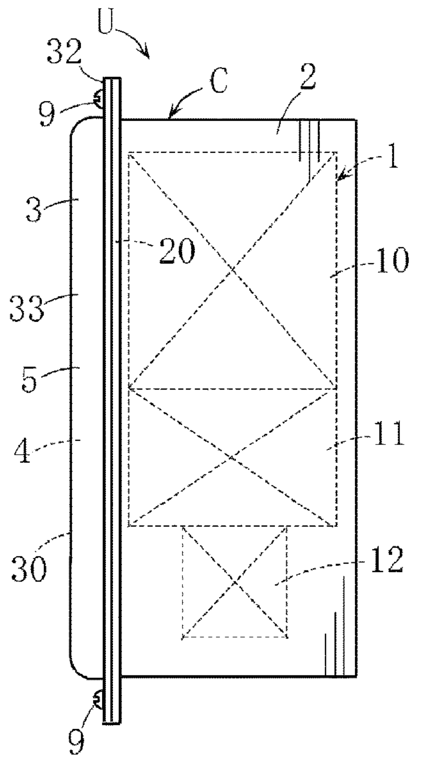
FIG. 1A is a side view representing an example of a hot water unit equipped with an outer case manufactured by the manufacturing method according to the present invention.
Figure 1B:
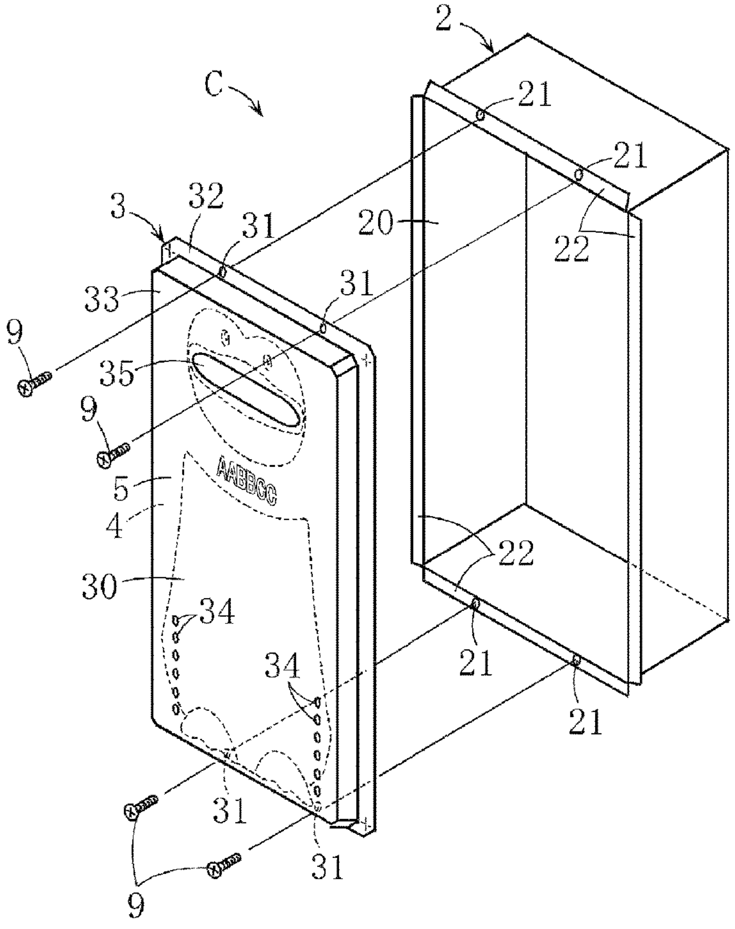
FIG. 1B is an exploded perspective view of the outer case shown in FIG. 1A.

Hereinafter, preferred embodiments of the present invention will be specifically described with reference to the drawings.

First, in order to facilitate understanding, a configuration of an outer case C for a hot water unit manufactured by the manufacturing method of the present embodiment, and a hot water unit U equipped with the outer case C will be described.

A hot water unit U shown in FIGS. 1A to 2B corresponds to a hot water supply device and includes an outer case C, and a hot water device 1 for generating hot water is accommodated inside the outer case C. The hot water device 1 is equipped with a heat exchanger 10 through which hot water flows, a burner 11 for heating the hot water in the heat exchanger 10, and a fan 12 for supplying combustion air to the burner 11.

The outer case C is equipped with a rectangular box-shaped outer case main body 2 having an opening 20 on a front surface, and a cover body 3 (a front cover body) that closes the opening 20. The cover body 3 is detachably attached to the front surface portion of the outer case main body 2 by utilizing, for example, a screw body 9 such as a screw and screw body insertion holes 31 and 21 through which the screw body 9 is inserted.

Figure 2A:
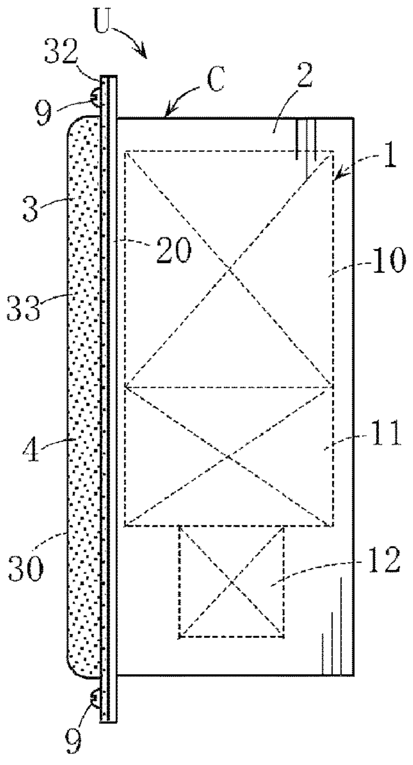
FIG. 2A is a side view of a state in which a clear layer is omitted in FIG. 1A.
Figure 2B:
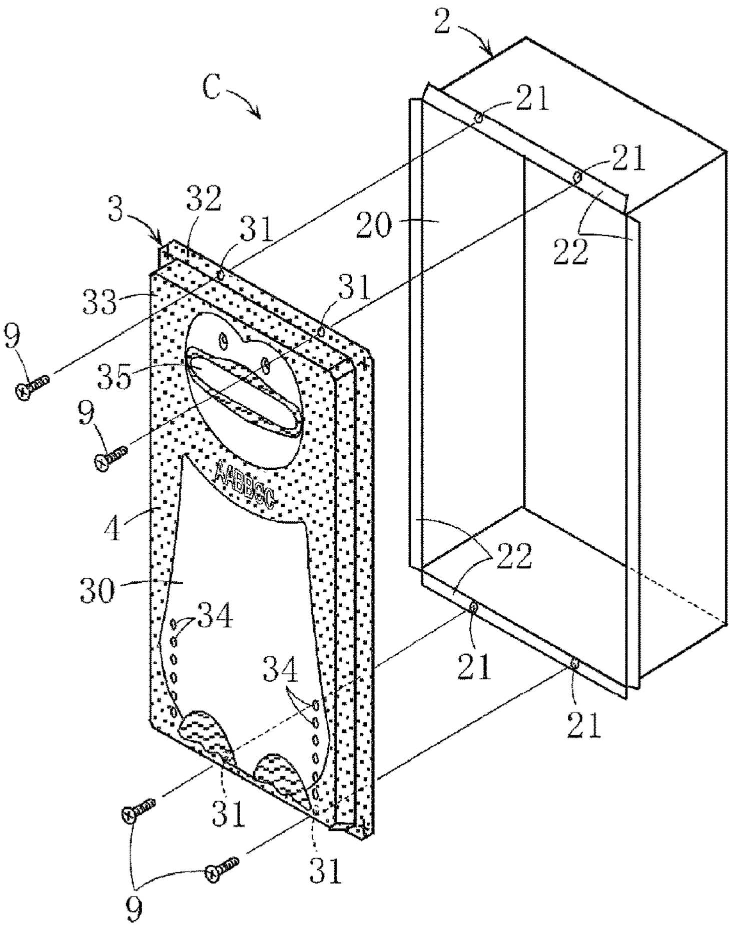
FIG. 2B is an exploded perspective view of a state in which the clear layer is omitted in FIG. 1B.

In the present embodiment, the cover body 3 is provided with an inkjet printing layer 4 (a portion having a halftone dot pattern or a wavy line pattern in FIGS. 2A and 2B) and a clear layer 5. The outer case main body 2 is not provided with these. Therefore, the configuration of the cover body 3 will be described below in detail, and the description of the outer case main body 2 will be omitted. However, as will be described below, an inkjet printing layer or a clear layer can be provided on the outer case main body 2.

The cover body 3 is a configuration in which an inkjet printing layer 4 (4_a_ to 4_g_) (see also FIGS. 3A and 5), and the clear layer 5 are provided on the colored steel plate 30 after press-molding (a metal plate provided with a paint layer).

Figure 4A:
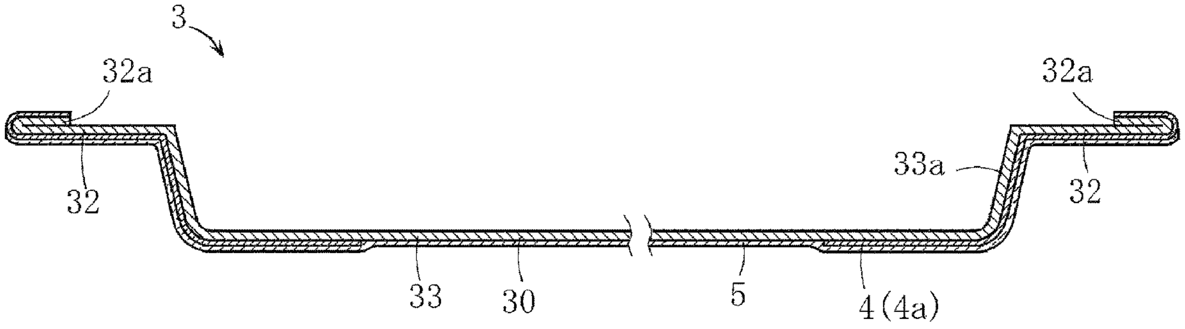
FIG. 4A is a cross-sectional view along a line IVA-IVA of FIG. 3A.

The cover body 3 has a panel shape having a substantially rectangular shape in a front view, and is equipped with an outer peripheral flange portion 32, and a bulging portion 33 which is surrounded by the outer peripheral flange portion 32 and bulges to the front of the outer peripheral flange portion 32 (a front side of the outer case C). The outer peripheral flange portion 32 is a portion for abutting on the substantially rectangular frame-shaped flange portion 22 provided on the front surface portion of the outer case main body 2, and as shown in FIG. 4A, a folded-back portion 32_a_ formed by hemming process is continuously provided on the outer edge portion thereof.

Figure 3A:
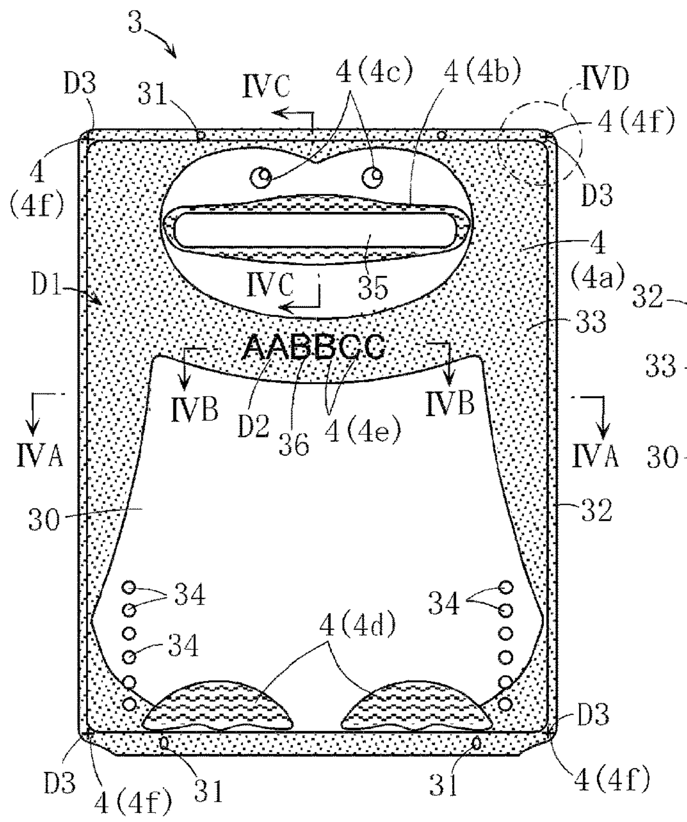
FIG. 3A is a front view of a state in which the clear layer of the cover body of the outer case shown in FIGS. 1A and 1B is omitted.
Figure 3B:
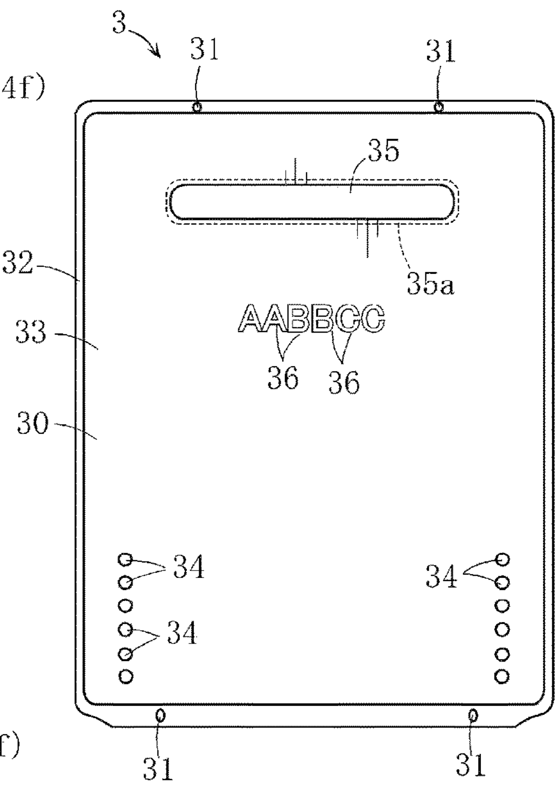
FIG. 3B is a front view of a state in which an inkjet printing layer of the cover body is omitted.
Figure 4B:
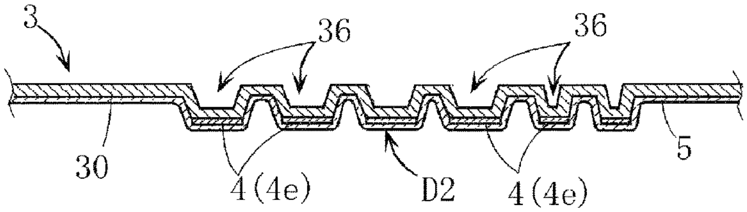
FIG. 4B is a cross-sectional view of a main part along a line IVB-IVB of FIG. 3A.
Figure 4C:
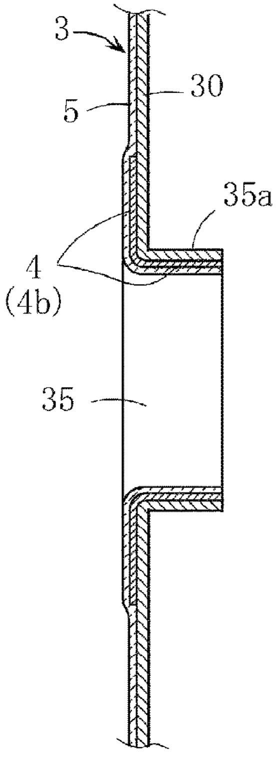
FIG. 4C is a cross-sectional view of a main part along a line IVC-IVC of FIG. 3A.

The bulging portion 33 of the cover body 3 occupies most of the cover body 3, and the bulging portion 33 is provided with an air supply port 34 and an exhaust port 35 (see also FIGS. 3A and 3B). The air supply port 34 is a portion that allows outside air to flow into the outer case C. The exhaust port 35 is a portion for discharging the exhaust gas after heat recovery by the heat exchanger 10 to the outside of the outer case C. As shown in FIG. 4C, the exhaust port is formed as a burring hole in which a tubular burring portion 35_a_ is continuously provided on the peripheral edge portion thereof.

The inkjet printing layer 4 is a coating film layer provided by utilizing an inkjet printer 8 as will be described below. As the ink for inkjet printing, a water-based pigment ink or a solvent-based pigment ink can be used. Preferably, the ink contains an ultraviolet curable resin and a thermosetting resin.

Inkjet printing layers 4_a_ to 4_d_ representing a desired pattern D1 such as a penguin, and an inkjet printing layer 4_e_ representing text D2 ("AABBCC" as an example in the drawing) indicating, for example, a maker, a model or a trademark of the hot water unit U provided on the surface of the cover body 3 are provided as the inkjet printing layer 4. An inkjet printing layer 4_f_ representing a positioning mark D3 for pressing, which will be described later, is provided at the four corners of the cover body 3. The positioning mark D3 is shown in the shape of "+" in the drawing, but is not limited thereto. Further, the positioning mark D3 may be configured to be provided on the back surface of the cover body 3 instead of or in addition to the front surface of the cover body 3.

Figure 5:
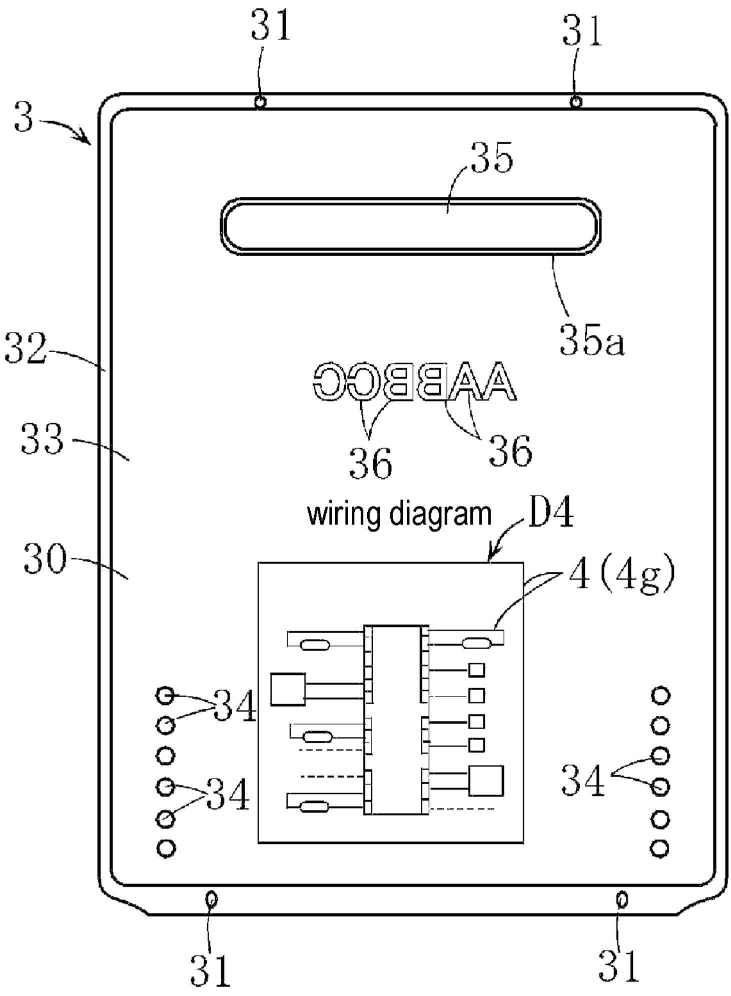
FIG. 5 is a rear view of the cover body shown in FIGS. 1A to 3A.

As shown in FIG. 5, an inkjet printing layer 4_g_ representing an electrical wiring diagram D4 of the hot water device 1 is further provided on the back surface of the cover body 3. Instead of or in addition to the electrical wiring diagram D4, it is also possible to provide a configuration representing a piping diagram of the hot water device 1. Although this is not illustrated or described, it is also possible to provide a configuration in which an inkjet printing layer representing a specification description, notes, or the like of the hot water unit U is further provided on the back surface of the cover body 3, in addition to the electrical wiring diagram D4 and the piping diagram.

Figure 7:
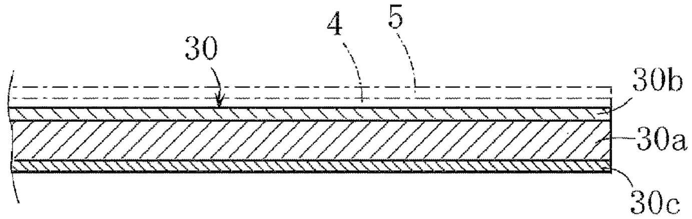
FIG. 7 is a cross-sectional view of a main part which shows an example of a colored steel plate used for manufacturing the cover body shown in FIGS. 1A to 3A.

As shown in FIG. 7, the colored steel plate 30 is a raw material of the cover body 3 and has a multi-layer structure with a plated steel sheet 30*a* (metal plate), a whitish (or white) front side coating layer 30*b* laminated on the surface of the plated steel sheet 30*a*, and a coating layer 30*c* on a back side as a base coat laminated on the back surface of the plated steel sheet 30*a*. The inkjet printing layers 4*a* to 4*e* have colors different from those of the whitish front side coating layer 30*b*, and represent a design D1 such as the appearance of the penguin and text D2. The white portion of FIG. 3A is a portion of the front side coating layer 30*b* of the colored steel plate 30 that has not been subjected to inkjet printing.

Figure 4D:
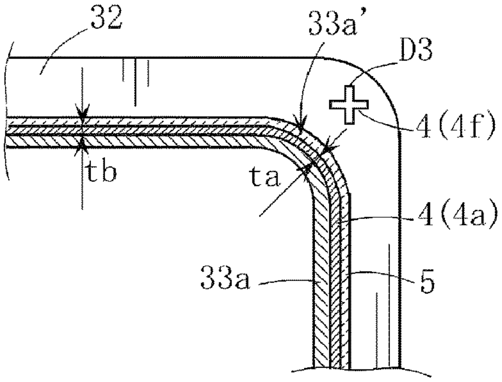
FIG. 4D is a front sectional view of a portion indicated by reference numeral IVD of FIG. 3A.

The entire region of the inkjet printing layer 4*a* is basically formed with the same color and the same thickness. However, as shown in FIG. 4D, a thickness to of a corner portion 33*a*' of a peripheral wall portion 33*a* (a wall portion rising from the outer peripheral flange portion 32) of the bulging portion 33 is thinner than a thickness tb of the other portion of the peripheral wall portion 33*a*, and a thickness of the portion other than the peripheral wall portion 33*a*. The bulging portion 33 is formed by drawing process, and in this drawing process, an amount of extension of the corner portion 33*a*' of the peripheral wall portion 33*a* is the largest (the corner portion 33*a*' corresponds to a 'portion in which the plate thickness of the metal plate is thinner than other portions, in the drawing portion'). If the thickness to of the inkjet printing layer 4*a* in that portion decreases accordingly, it is possible to obtain the effect of preventing the inkjet printing layer 4*a* from peeling, as will be described later. When the amount of drawing (the amount of extension) of the peripheral wall portion 33*a* increases to increase the amount of bulging of the bulging portion 33, the thickness tb of the portion of the peripheral wall portion 33*a* other than the corner portion 33*a*' may be thinner than the thickness of other portions of the inkjet printing layer 4*a*.

The inkjet printing layer 4*b* is provided in the peripheral portion of the exhaust port 35. As described with reference to FIG. 4C, the exhaust port 35 is formed as a burring hole having a burring portion 35*a*. In contrast, a part of the inkjet printing layer 4*b* is also provided on the inner surface of the burring portion 35*a*. As a result, the peripheral portion of the exhaust port and the inner surface of the burring portion 35*a* can be aligned in the same color or pattern, and the appearance of the exhaust port 35 and its peripheral portion can be improved.

The inkjet printing layer 4*e* is provided on the front surface of a step pressing portion 36 (see also FIGS. 3B and 4B) that three-dimensionally represents the text D2. More specifically, the step pressing portion 36 is a portion in which the text D2 is three-dimensionally formed by partially extruding a part of the colored steel plate 30 by pressing, and the inkjet printing layer 4*e* is provided on the front surface portion of such a step pressing portion 36. Although the step pressing portion 36 includes a front convex form in which a part of the colored steel plate 30 is extruded to the front side of the cover body 3, and a front concave form in which a part of the colored steel plate 30 is extruded to the rear side of the cover body 3, it does not matter which one is adopted.

The clear layer 5 is formed over substantially the entire region of the front surface portion of the cover body 3 to cover the inkjet printing layer 4. As shown in FIG. 4B, the clear layer 5 is also formed in a recess in a region forming the letter D2. Further, as shown in FIG. 4C, the clear layer 5 is also provided on the inner surface of the burring portion 35*a*. Since the back surface of the cover body 3 is not directly exposed to wind, rain or sunlight, the clear layer 5 is not provided. However, it is possible to provide a configuration in which the clear layer 5 is also provided on the back surface of the cover body 3 to protect the inkjet printing layer 4*g*. In this case, instead of providing the clear layer 5 on the entire back surface, it is possible to provide a configuration in which the clear layer 5 is provided only in a region in which the inkjet printing layer 4*g* is provided.

The clear layer 5 is made of a resin paint that does not contain a pigment, but contains an ultraviolet absorber. Further, the clear layer 5 is made of a thermosetting resin or an ultraviolet curable resin.

Next, an example of the method of manufacturing the cover body 3 described above will be described.

Figures 6A, 6B, 6C, 6D, 6E, 6F, 6G:
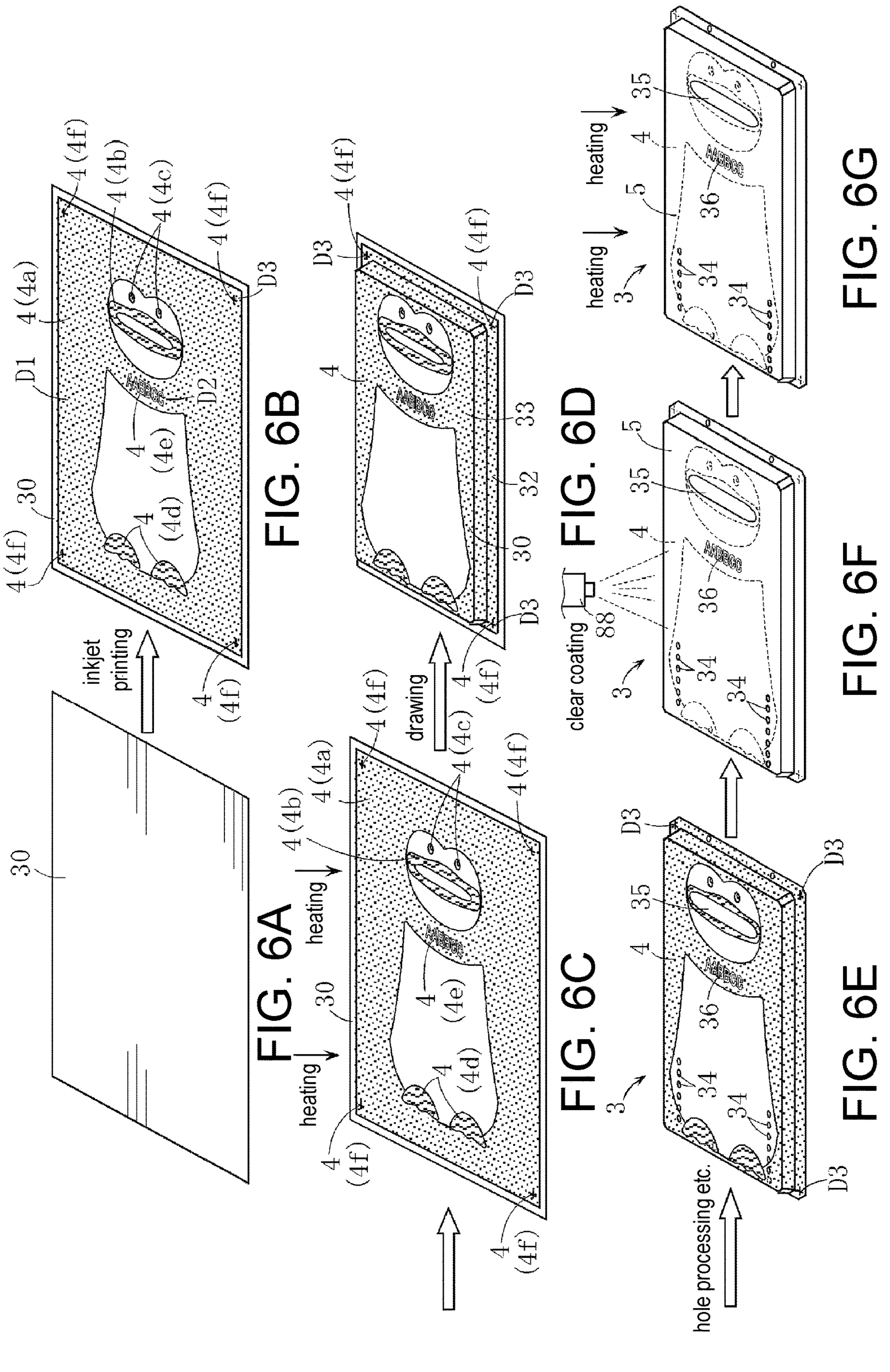
FIGS. 6A to 6G are explanatory views representing an example of the manufacturing method according to the present invention, and correspond to a series of working processes of the cover body manufacturing method shown in FIGS. 1A to 3A.

First, as shown in FIG. 6A, a flat plate-shaped color steel plate 30 is prepared as a raw material for the cover body 3. The configuration of the color steel sheet 30 is as described above with reference to FIG. 7. Next, the color steel plate 30 is subjected to inkjet printing. As a result, as shown in FIG. 6B, the inkjet printing layer 4 is provided. Specific examples of the inkjet printing layer 4 are as described above.

Figure 8A:
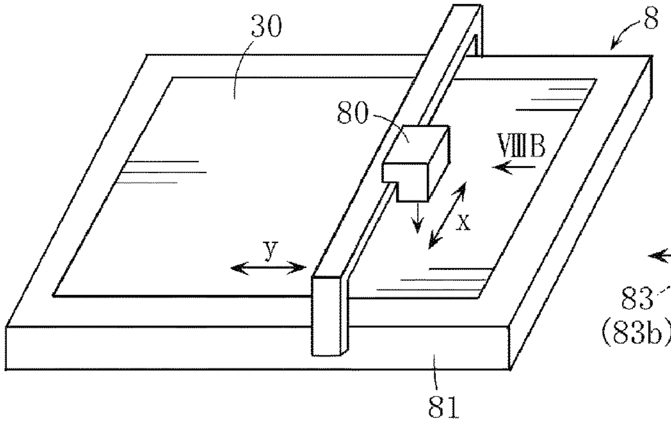
FIG. 8A is a perspective view representing an example of a schematic configuration of a printer used for inkjet printing.
Figure 8B:
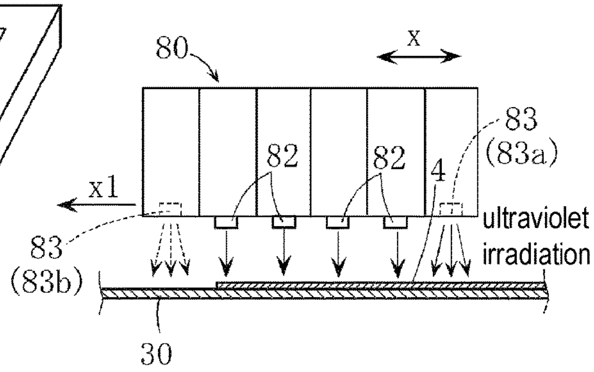
FIG. 8B is a view taken along an arrow VIIIB of FIG. 8A, representing a schematic structure of a print head of the printer shown in FIG. 8A.

The inkjet printing is performed using, for example, an inkjet printer 8 as shown in FIG. 8A. In the inkjet printer 8, the print head 80 is movable in the x and y directions orthogonal to each other on the upper side of a mounting table 81 on which the colored steel plate 30 is mounted and supported. As shown in FIG. 8B, the print head 80 includes a plurality of inkjet nozzles 82 that atomize an inkjet paint of a predetermined color and spray it toward the colored steel plate 30 and this point is the same as that known in the related art. A pair of ultraviolet light sources 83 (83*a*, 83*b*) are further provided in the vicinity of the inkjet nozzle 82.

For example, when inkjet printing is performed while the print head 80 is moved in the xl direction of FIG. 8B as a main scanning direction, an ultraviolet light source 83*a* on the rear side in the main scanning direction is made to emit light, and ultraviolet rays are radiated to the region immediately after the inkjet printing. Since the inkjet printing layer 4 contains an ultraviolet curable resin, the inkjet printing layer 4 can be rapidly cured (cured to the extent that bleeding does not occur, which will be described later) by irradiation of the ultraviolet rays. Therefore, it is possible to prevent the uncured inkjet printing layers 4 having different colors from being mixed with each other and causing bleeding. When the inkjet printing is carried out in a direction opposite to the xl direction described above, the same effect as described above can be obtained by causing the ultraviolet light source 83*b* to emit light instead of the ultraviolet light source 83*a*.

When the inkjet printing layer 4*a* is provided, the thickness to of the colored steel plate at a planned portion which is the corner portion 33*a*' of the peripheral wall portion 33*a* shown in FIG. 4D is set to be thinner than the thickness tb of other portions.

After the above-mentioned inkjet printing on both the front and back surfaces of the color steel sheet 30 is completed, as shown in FIG. 6C, while heating and drying the inkjet printing layer 4, the thermosetting resin contained in the inkjet printing layer 4 is cured. The heating is performed using, for example, a heating furnace. By such a process, the strength of the inkjet printing layer 4 can be increased, and in addition, the durability against the pressing to be performed thereafter can also be improved.

Next, the colored steel plate 30 is subjected to drawing process as a pressing to form an outer peripheral flange portion 32 and a bulging portion 33 as shown in FIG. 6D. After that, as shown in FIG. 6E, the pressing step for forming the air supply port 34, the exhaust port 35, the step pressing portion 36, and the like, the trimming process for removing an excess portion of the outer peripheral flange portion 32, a subsequent hemming process and the like are performed.

After the outer shape of the cover body 3 is finished as described above, as shown in FIG. 6F, the cover body 3 is subjected to clear coating to form the clear layer 5 over substantially the entire region of the front surface of the cover body 3. The clear paint is mainly made of a thermosetting resin (or an ultraviolet curable resin) containing an ultraviolet absorber. The clear coating is, for example, a spray coating in which a clear paint is sprayed from a spray nozzle 88. After the clear coating is completed, the clear layer 5 is heated, dried and cured as shown in FIG. 6G The heating is, for example, heating using a heating lamp. Alternatively, when the clear layer 5 is made of an ultraviolet curable resin, it is cured by ultraviolet irradiation.

The cover body 3 described above can be appropriately manufactured by a series of working processes as described above.

Figure 9:
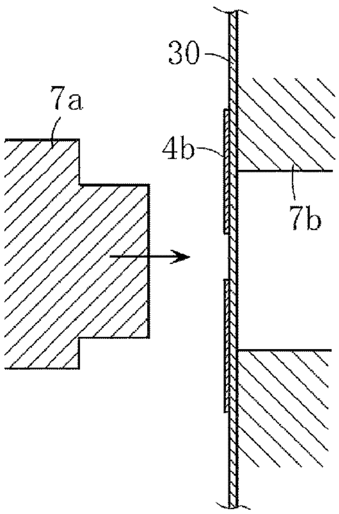
FIG. 9 is cross-sectional view of the main part which shows an example of the working process for obtaining a structure of FIG. 4C.

In the above-mentioned pressing step, it is possible to accurately position the color steel sheet 30 with reference to the positioning mark D3. Further, the forming work of the exhaust port 35 is performed, using a punch 7*a* and a die 7*b*, for example, as shown in FIG. 9. However, since the inkjet printing layers 4*b* is provided not only in the peripheral portion of the planned formation location of the exhaust port 35 but also at a formation target location of the exhaust port 35 serially, as shown in FIG. 4C, it is possible to appropriately realize a configuration in which the inkjet printing layers 4*b* are provided serially from the peripheral portion of the exhaust port 35 to the burring portion 35*a*.

Since the design D1 such as a penguins is displayed on the front surface portion of the cover body 3, the outer case C equipped with the cover body 3 described above has an excellent design properties, for example, compared to a case in which the surface of the cover body 3 has a single color and no pattern. In particular, the presence of the clear layer 5 enables various expressions such as glossy and matte. Further, since the inner surface of the burring portion of the exhaust port 35 is continuously painted on the peripheral portion of the exhaust port 35, the appearance is better than in a case in which the inside of the burring portion 35*a* is colored differently from the peripheral portion of the burring portion 35*a*. Further, in the corner portion 33*a*' of the peripheral wall portion 33*a*, a part of the color steel plate 30 greatly extends by drawing process. However, since the thickness to of the inkjet printing layer 4 in this portion is thinner than the thickness tb of the other portion, it is also possible to prevent a problem that the inkjet printing layer 4 from being easily peeled off by the above-mentioned drawing process.

Since the electrical wiring diagram D4 or the piping diagram is represented by the inkjet printing layer 4*g* on the back surface of the cover body 3, it is convenient for maintenance work and the like. For example, when the means such as a sheet with a printed electrical wiring diagram is stuck to the back surface of the cover body 3, the sheet may be damaged or peeled off of the cover body 3 and lost. In contrast, according to the present embodiment, there is no such risk.

Since the coating film layer representing the design D1, the text D2, the positioning mark D3, the electrical wiring diagram D4, and the like of the cover body 3 is all included in the inkjet printing layer 4, it can be easily provided using the inkjet printer 8 as described above. For example, unlike painting by the spray method, a masking process and color matching of paint are not required, and skill is not required. Therefore, it is possible to improve workability and productivity. In addition, it is easy to change the design of the design D1 and the like, and it is suitable for small-quantity and large-variety production. Further, according to the inkjet printing, there is no or little waste of ink paint, and it is economical.

Furthermore, since the inkjet printing is performed before the pressing step, there is no problem that the inkjet printing on the uneven portion formed by the pressing step becomes difficult.

Since the clear layer 5 covers and protects the inkjet printing layer 4 on the front surface of the cover body 3, the weather resistance of the inkjet printing layer 4 is enhanced and the stain resistance is excellent. In particular, since the clear layer 5 contains an ultraviolet absorber, the color of the inkjet printing layer 4 does not fade due to the ultraviolet rays of the sunlight. Further, the clear layer 5 also has an effect of suppressing the peeling of the inkjet printing layer 4, and the effect is further excellent because the clear layer 5 is provided in substantially the entire region of the front surface portion of the cover body 3.

Since the clear coating for providing the clear layer 5 is performed after the pressing step, the clear layer 5 is not cracked or peeled due to the pressing step. The clear layer 5 can be made thick and hard.

The present invention is not limited to the contents of the above-described embodiment. The specific configuration of each working process of the method of manufacturing the outer case for the hot water unit according to the present invention can be variously changed within the scope intended by the present invention.

In the above-described embodiment, although an example in which only the cover body 3 is subjected to inkjet printing or clear coating is shown, in the present invention, instead of or in addition to this, the outer case main body 2 may also be subjected to inkjet printing or clear coating. When the outer case main body 2 is not subjected to inkjet printing, only clear coating may be applied. The specific contents such as letters and patterns represented by the inkjet printing layer of the present invention are not limited, and at least one of letters, symbols, figures, and patterns may be represented. The clear layer may be provided after the pressing step to cover the inkjet printing layer. Further, the clear layer may be colored and transparent instead of colorless and transparent.

The hot water unit referred to in the present invention is a concept that also includes a hot water storage tank unit or the like in which a hot water device for storing hot water such as a hot water storage tank or the like is accommodated in the outer case, instead of a configuration in which a hot water device for generating hot water such as a hot water supply device is accommodated in the outer case. Therefore, the outer case is not limited to a combination of the front opening-shaped outer case main body and the cover body that closes the front opening portion.

Although a flat metal plate is used as the material of the outer case, it is possible to use a material other than the color steel plate, as the metal plate.

The invention claimed is:

1. A method of manufacturing an outer case for a hot water unit, the method comprising:

a pressing step of pressing a flat metal plate to form a component part of an outer case used to accommodate a hot water device for generating hot water or storing hot water inside; and a painting step of painting one of text, symbols, figures or patterns on the component part of the outer case, wherein the painting step includes an inkjet printing step of forming an inkjet printing layer by performing inkjet printing on the flat metal plate, the pressing step is performed after the inkjet printing step, the pressing step includes a step of drawing the metal plate, in the inkjet printing step, a thickness of a first portion of the inkjet printing layer in a portion of a planned region of drawing in which a thickness of the metal plate is thinner than that of other portions is set to be thinner than a thickness of a second portion of the inkjet printing layer of the other portions, and after the pressing step, a clear coating step of forming a clear layer on the inkjet printing layer is further included.

2. The method of manufacturing an outer case for a hot water unit according to claim 1, wherein a clear paint containing an ultraviolet absorber is used in the clear coating step.

3. The method of manufacturing an outer case for a hot water unit according to claim 1, wherein the clear coating step is spray coating using a clear paint containing an ultraviolet curable resin or a thermosetting resin, as a paint.

4. The method of manufacturing an outer case for a hot water unit according to claim 1, wherein the outer case includes an outer case main body having an opening on at least one surface, and a cover body attached to the outer case main body to close the opening, and the inkjet printing step, the pressing step, and the clear coating step are performed as a manufacturing means of the cover body.

5. The method of manufacturing an outer case for a hot water unit according to claim 1, wherein the pressing step includes a step of providing the metal plate with a burring hole into which a burring portion protrudes from a peripheral edge of the opening, and in the inkjet printing step, a second inkjet printing layer connected to a first inkjet printing layer provided in the peripheral portion is provided as the inkjet printing layer in a planned region which is the burring portion.

6. The method of manufacturing an outer case for a hot water unit according to claim 1, wherein, in the inkjet printing step, a mark for positioning the metal plate at the time of performing the pressing step is printed.

* * * * *